United States Patent
Nagata et al.

(10) Patent No.: US 8,032,154 B2
(45) Date of Patent: Oct. 4, 2011

(54) WIRELESS DEVICE

(75) Inventors: Keizo Nagata, Anpachi (JP); Mikio Obara, Hashima (JP)

(73) Assignee: Kyocera Corporation, Kyota (JP)

( * ) Notice: Subject to any disclaimer, the term of this patent is extended or adjusted under 35 U.S.C. 154(b) by 843 days.

(21) Appl. No.: 12/063,128

(22) PCT Filed: Aug. 9, 2006

(86) PCT No.: PCT/JP2006/315737
§ 371 (c)(1),
(2), (4) Date: Feb. 7, 2008

(87) PCT Pub. No.: WO2007/020848
PCT Pub. Date: Feb. 22, 2007

(65) Prior Publication Data
US 2009/0042584 A1 Feb. 12, 2009

(30) Foreign Application Priority Data
Aug. 12, 2005 (JP) .................. 2005-235073

(51) Int. Cl.
*H04W 24/00* (2009.01)
(52) U.S. Cl. .................. 455/456.1; 455/404.2
(58) Field of Classification Search ............. 455/404.2, 455/414.1–414.3, 440, 456.1–457
See application file for complete search history.

(56) References Cited

U.S. PATENT DOCUMENTS

| 5,590,043 | A | * | 12/1996 | McBurney | 701/207 |
| 5,598,166 | A | * | 1/1997 | Ishikawa et al. | 342/357.3 |
| 5,935,191 | A | * | 8/1999 | Sakanashi et al. | 701/207 |
| 2003/0129995 | A1 | * | 7/2003 | Niwa et al. | 455/456 |
| 2003/0146871 | A1 | * | 8/2003 | Karr et al. | 342/457 |
| 2003/0176196 | A1 | * | 9/2003 | Hall et al. | 455/456.1 |

FOREIGN PATENT DOCUMENTS

| JP | 07-055480 | 3/1995 |
| JP | 08-271607 | 10/1996 |
| JP | 8-512130 | 12/1996 |
| JP | 2000-002759 | 1/2000 |
| JP | 2002-257564 | 9/2002 |
| JP | 2002-277528 | 9/2002 |
| JP | 2003-121528 | 4/2003 |
| JP | 2005-215414 | 8/2005 |

* cited by examiner

*Primary Examiner* — Jinsong Hu
*Assistant Examiner* — Michael Nguyen
(74) *Attorney, Agent, or Firm* — Morrison & Foerster LLP

(57) ABSTRACT

A wireless device 30 according to the present invention includes a location information acquiring unit 31 configured to acquire location information of the wireless device; an estimated error value acquiring unit 33 configured to acquire an estimated error value of the acquired location information; a moving status determining unit 34 configured to determine a moving status of the wireless device; and a location determining unit 36 configured to determine a location where the wireless device exists, based on the acquired estimated error value and the determined moving status.

5 Claims, 13 Drawing Sheets

US 8,032,154 B2

WIRELESS DEVICE

TECHNICAL FIELD

The present invention relates to a wireless device capable of communicating via a wireless network. More particularly, the present invention relates to a wireless device including a function to acquire its own location information.

BACKGROUND ART

Conventionally, a wireless device has been known in which its own location information is acquired using a GPS (Global Positioning System) function.

However, there has been a problem that the conventional wireless device cannot acquire location information with a sufficient positioning accuracy depending on an influence from a surrounding environment of a positioning point. Therefore, the conventional wireless device may fail to recognize, with the sufficient positioning accuracy, a location where the wireless device exists.

In order to solve the above-described problem, a method has been devised in which an averaging process is performed on location information (hereinafter referred to as a positioning coordinate point) acquired by using a positioning function so that the location where the wireless device exists is determined.

However, there has been a problem in the above-described method that the result acquired by performing the averaging process on the positioning coordinate point does not approximate the true coordinate point, such as when the positioning coordinate point has an offset value to the true coordinate point due to the influence from such as the surrounding environment of the positioning point, the disposition of a GPS satellite, and the like.

In addition, there has been a problem that a positioning accuracy is drastically decreased when the wireless device is in a moving state and when the location where the wireless device exists is determined based on a result acquired by averaging a current coordinate point and a previous coordinate point.

DISCLOSURE OF THE INVENTION

The present invention has been made in view of the above-described problems, and has an object of providing a wireless device which can determine, with the sufficient positioning accuracy, the location where the wireless device exists, even when the positioning coordinate point has the offset value to the true coordinate point due to the influence from such as the surrounding environment of the positioning point, the disposition of the GPS satellite and the like, or even when the wireless device is in the moving state.

A first aspect of the present invention is a wireless device capable of communicating via a wireless network, including: a location information acquiring unit configured to acquire location information of the wireless device; an estimated error value acquiring unit configured to acquire an estimated error value of the acquired location information; a moving status determining unit configured to determine a moving status of the wireless device; and a location determining unit configured to determine a location where the wireless device exists, based on the acquired estimated error value and the determined moving status.

In the first aspect of the present invention, the location determining unit may be configured to determine the location where the wireless device exists, based on the location information from which the estimated error value was acquired, when the moving status determining unit determines that the moving status of the wireless device is a high-speed moving state and when the acquired estimated error value is smaller than a high speed error threshold.

In the first aspect of the present invention, the location determining unit may be configured to determine the location where the wireless device exists, based on the location information from which a minimum value of estimated error values was acquired, when the moving status determining unit determines that the moving status of the wireless device is a middle-speed moving state and when the minimum value of the estimated error values acquired within a predetermined period is smaller than a middle speed error threshold.

In the first aspect of the present invention, the wireless device further includes a moving distance accumulating unit configured to accumulate a moving distance of the wireless device, and the location determining unit may be configured to determine the location where the wireless device exists, based on the location information from which the minimum value of the estimated error values was acquired, when the moving status determining unit determines that the moving status of the wireless device is a low-speed moving state, when an accumulated moving distance is greater than a moving distance threshold value, and when the minimum value of the estimated error values acquired within a predetermined period is smaller than a low speed error threshold.

In the first aspect of the present invention, the location determining unit may be configured to determine the location where the wireless device exists, based on the location information from which a last updated minimum value of the estimated error values was acquired, when the moving status determining unit determines that the moving status of the wireless device is a stationary state and when the number of times that the minimum value of the estimated error values, within a same error estimation rank, has been updated reaches a first threshold value.

In the first aspect of the present invention, the number of times that the minimum value of the estimated error values has been updated may be configured to be reset when an error estimation rank to which an acquired estimated error value belongs is higher than an error estimation rank to which the previously acquired estimated error value belongs.

In the first aspect of the present invention, the location determining unit may be configured to determine the location where the wireless device exists, so based on the location information from which the minimum value of the estimated error values was acquired, when the moving status determining unit determines that the moving status of the wireless device is the stationary state and when the number of times that the minimum value of the estimated error values has been updated reaches a second threshold value.

BEST MODES FOR CARRYING OUT THE INVENTION

Configuration of Wireless Device According to First Embodiment of the Present Invention A configuration of a wireless device 30 according to a first embodiment of the present invention will be described with reference to FIGS. 1 to 3. The wireless device 30 according to the present embodiment is a device capable of communicating via a wireless network, and, for example, corresponds to a mobile communication terminal with a GPS positioning function mounted thereon, a GPS receiver mounted on a vehicle, or the like.

Figure 1:
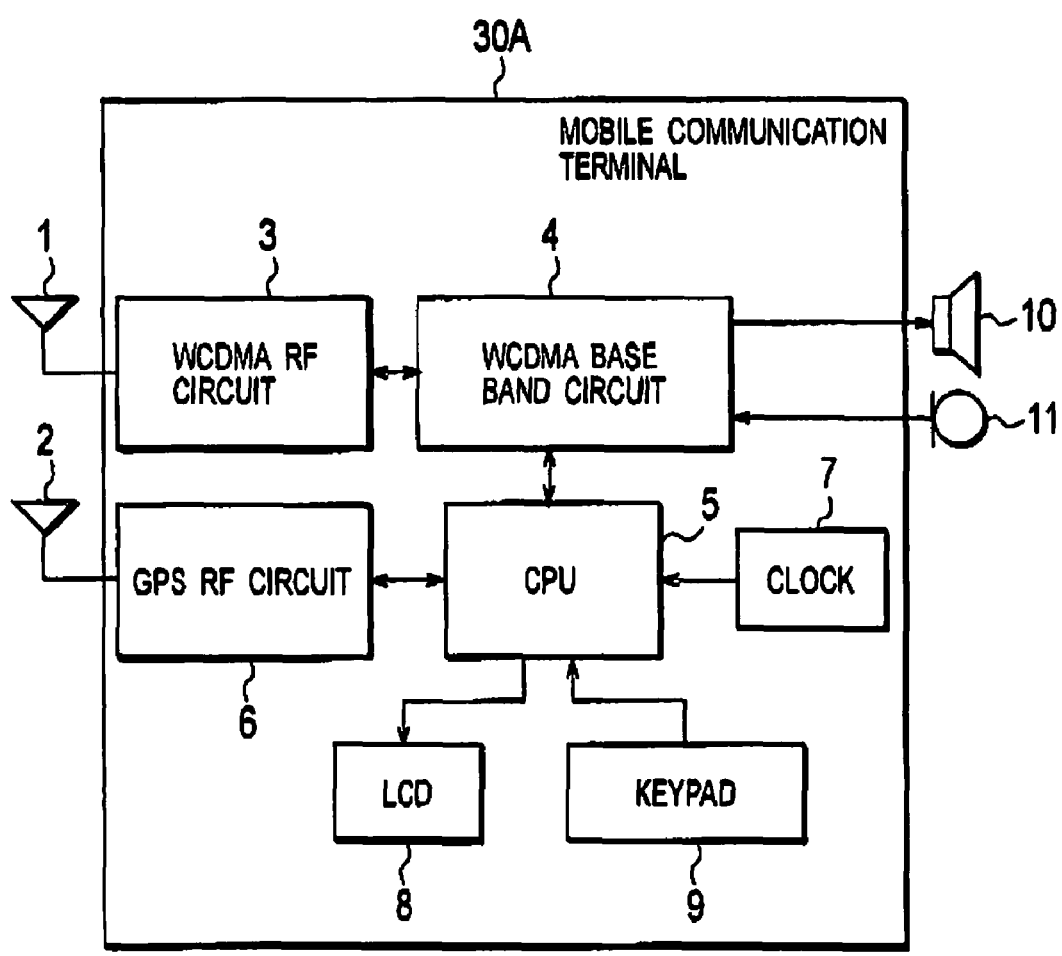
FIG. 1 is a diagram showing a hardware configuration of a wireless device according to a first embodiment of the present invention.

FIG. 1 shows a hardware configuration of a WCDMA type mobile communication terminal 30A, which represents an example of the wireless device 30 according to this embodiment. The mobile communication terminal 30A is provided with antennas 1, 2, a WCDMA RF circuit 3, a WCDMA base so band circuit 4, a CPU 5, a GPS RF circuit 6, a clock 7, an LCD 8, a keypad 9, a speaker 10, and a microphone 11.

In this regard, a signal received by the antenna 1 is amplified and elected by the WCDMA RF circuit 3, and inputted to the WCDMA base band circuit 4. Thereafter, the signal is demodulated by the WCDMA base band circuit 4 and transmitted to the CPU 5.

Further, the GPS RF circuit (GPS module) 6 is configured to amplify and analyze a signal transmitted from a GPS satellite and received by the antenna 2, and to transmit the signal to the CPU 5 as location information of the mobile communication terminal 30A.

In response to a user's input through keypad 9 and time information from clock 7, the CPU 5 is configured to instruct the GPS RF circuit 6 to acquire the location information of the mobile communication terminal 30A, and to display, on the LCD 8, the location information of the mobile communication terminal 30A acquired by the GPS RF circuit 6.

When it is required to inform the location information of mobile communication terminal 30A to a network side, the CPU 5 is configured to inform, to a base station, the location information of the mobile communication terminal 30A acquired by the GPS RF circuit 6, via the WCDMA base band circuit 4, the WCDMA RF circuit 3, and the antenna 1.

Figure 2:
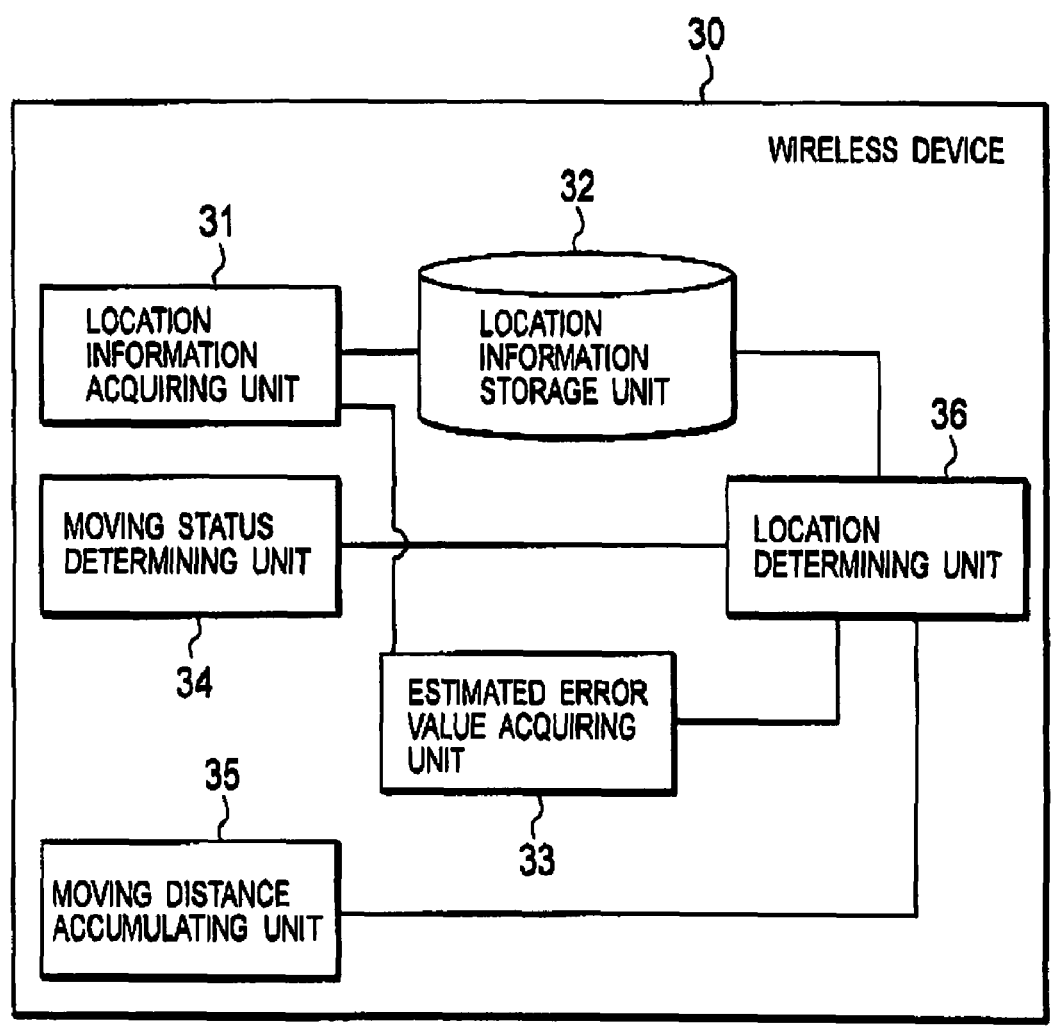
FIG. 2 is a functional block diagram of the wireless device according to the first embodiment of the present invention.

FIG. 2 shows a functional block diagram of the wireless device 30 according to the present embodiment. To be more specific, as shown in FIG. 2, the wireless device 30 of the present embodiment is provided with a location information acquiring unit 31, a location information storage unit 32, an estimated error value acquiring unit 33, a moving status determining unit 34, a moving distance accumulating unit 35, and a location determining unit 36.

Further, the location information acquiring unit 31, the location information storage unit 32, the estimated error value acquiring unit 33, and the moving distance accumulating unit 35 are connected to a GPS positioning function unit, which is not shown in the diagram.

The location information acquiring unit 31 is configured to acquire location information of the wireless device 30 by using a positioning function such as a GPS positioning function or the like.

The location information storage unit 32 is configured to store the location information of the wireless device 30 acquired by the location information acquiring unit 31. For example, the location information storage unit 32 may be configured to store the previously acquired location information of the wireless device 30, until a predetermined period has passed.

The estimated error value acquiring unit 33 is configured to acquire an estimated error value of the location information of the wireless device 30, the estimated error value acquired by the location information acquiring unit 31.

Figure 3:
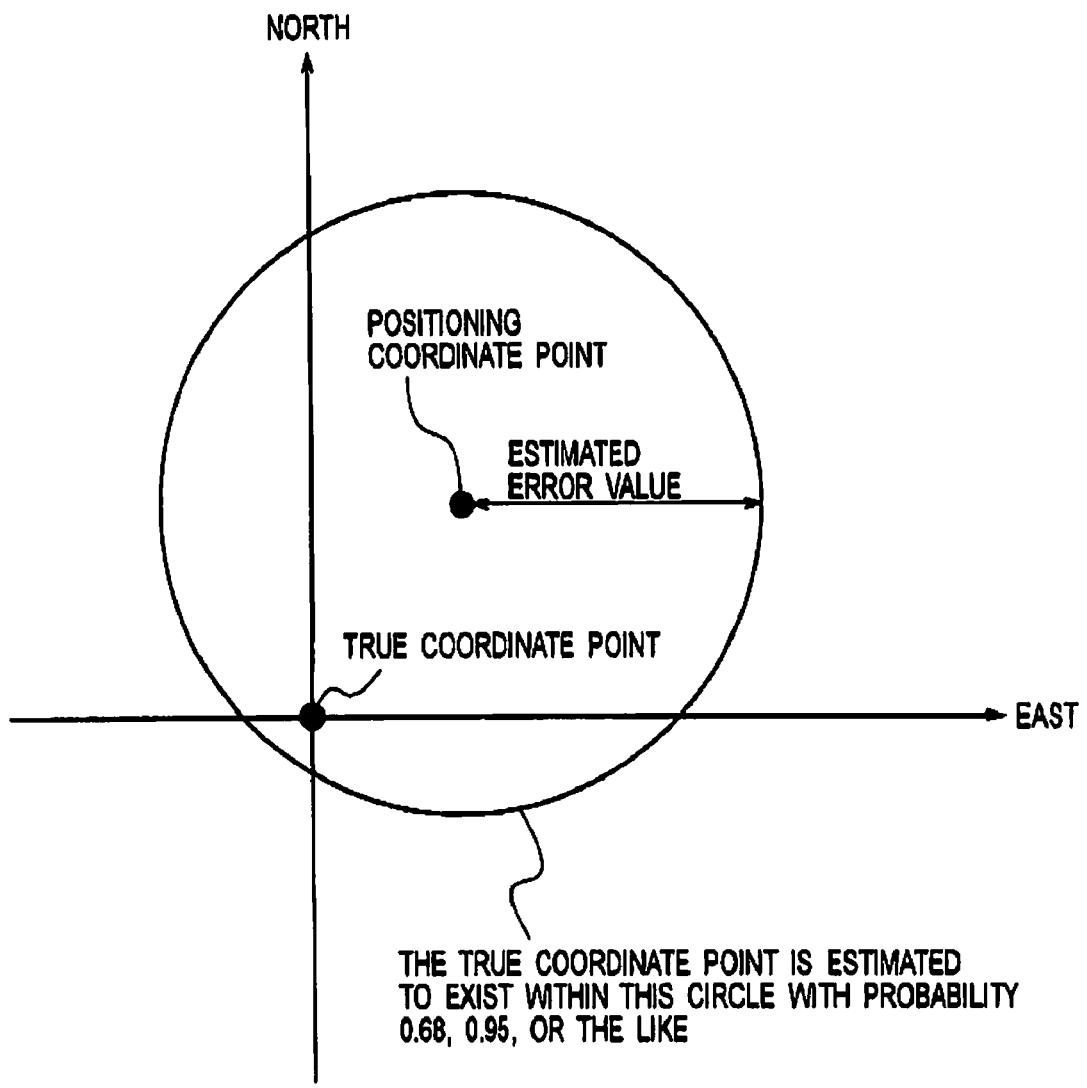
FIG. 3 is a diagram for showing an estimated error value used by the wireless device according to the first embodiment of the present invention.

With reference to FIG. 3, the estimated error value will be described. In this description, a positioning accuracy is indicated using the estimated error value.

The estimated error value is a value statistically representing a distance between a positioning coordinate point and a true coordinate point. In an example shown in FIG. 3, assuming that the true coordinate point obeys a standard normal distribution, it is estimated that the true coordinate point exists within a circle which has the estimated error value as a radius and a positioning coordinate point as a center, with probability 0.68, 0.95, or the like.

As a result, it is estimated that the smaller the estimated error value is, the closer the location information (the positioning coordinate point) to the true coordinate point is. Here, the location information of the wireless device 30 is acquired by the location information acquiring unit 31.

Further, the estimated error value acquiring unit 33 may be configured to store the previously acquired estimated error values, until a predetermined period has passed.

The moving status determining unit 34 is configured to determine a moving status of the wireless device 30. More specifically, the moving status determining unit 34 is configured to determine, based on the moving speed so information of the wireless device 30 acquired from the GPS satellite, categories to which the moving status of the wireless device 30 corresponds: "high-speed moving status (e.g., 15 m/sec or more)," "middle-speed moving status (e.g., not less than 1 m/sec and less than 15 m/sec)," "low-speed moving status (e.g., not less than 0.1 m/sec and less than 1 m/sec)," or "stationary status (e.g., less than 0.1 m/sec)."

The moving distance accumulating unit 35 is configured to accumulate a moving distance of the wireless device 30. For example, the moving distance accumulating unit 35 is configured to store the moving distance of the wireless device 30 until an instruction to reset is given, or until a predetermined period has passed.

The location determining unit 36 is configured to determine the location where the wireless device 30 exists, based on the estimated error value acquired by the estimated error value acquiring unit 33, and the moving status of the wireless device 30 determined by the moving status determining unit 34. A specific method to determine the location where the wireless device 30 exists will be described later.

Operation of Wireless Device According to First Embodiment of the Present Invention Operation of determining a location where a wireless device 30 exists, according to the present embodiment, will be described with reference to FIGS. 4 to 14.

Figure 4:
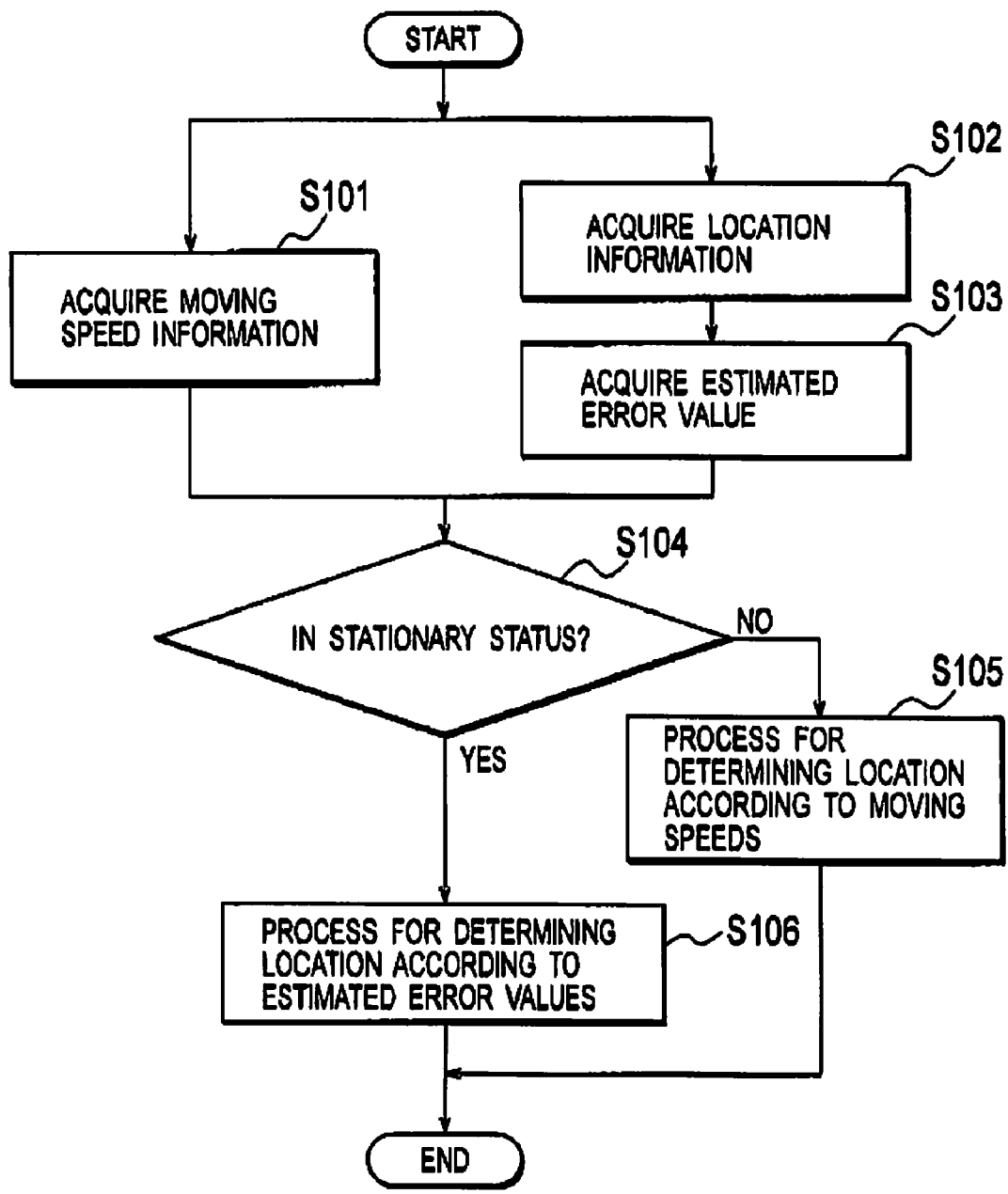
FIG. 4 is a flowchart showing an entire operation of the wireless device according to the first embodiment of the present invention when the wireless device positions location information.

As shown in FIG. 4, in Step S101, the moving status determining unit 34 acquires moving speed information of the wireless device 30 from a GPS positioning function unit, and determines a moving status of the wireless device 30 based on the acquired moving speed information of the wireless device 30.

Meanwhile, in Step S102, the location information acquiring unit 31 acquires location information (a positioning coordinate point) of the wireless device 30 from the GPS positioning function unit, and, in Step S103, the estimated error value acquiring unit 33 acquires an estimated error value of the location information of the wireless device 30.

In Step S104, the location determining unit 36 determines whether the moving status of the wireless device 30 is in a stationary status.

When it is determined that the moving status of the wireless device 30 is not in the stationary status, in Step S105, the location determining unit 36 performs a process for determining the location according to the moving speeds. On the other hand, when it is determined that the moving status of the wireless device 30 is in the stationary status, in Step S106, the location determining unit 36 performs a process for determining the location according to the estimated error values.

Hereinafter, with reference to FIGS. 5 to 10, the process for determining the location according to the moving speeds, which is performed in Step S106, will be described in detail. Further, with reference to FIGS. 11 to 14, the process for determining the location according to the estimated error values, which is performed in Step S106, will be described in detail.

Firstly, with reference to FIGS. 5 and 6, a description will be given of the process for determining the location when the moving status of the wireless device 30 is the "low-speed moving status".

Figure 5:
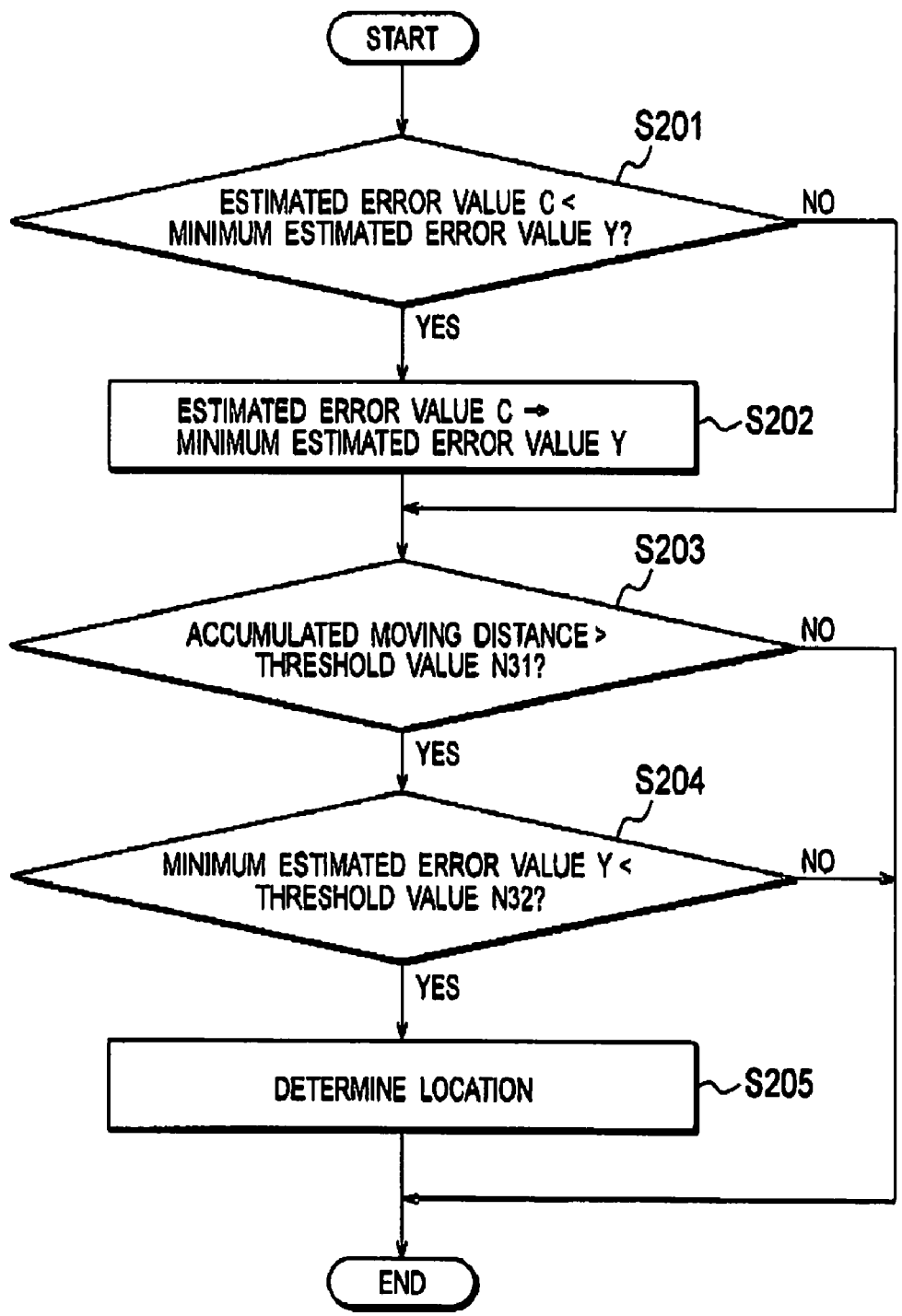
FIG. 5 is a flowchart showing an operation of the wireless device according to the first embodiment of the present invention when the wireless device positions location information while moving at a low speed.

As shown in FIG. 5, in Step S201, the location determining unit 36 compares an estimated error value C of the coordinate point (location information of the wireless device 30) C, which is acquired by a current positioning, and a stored minimum estimated error value Y.

When the estimated error value C is smaller than the minimum estimated error value Y, in Step S202, the location determining unit 36 substitutes the estimated error value C into the minimum estimated error value Y. Otherwise, the present process proceeds to Step S203.

In Step S203, the location determining unit 36 compares a moving distance threshold value N31 and an accumulated moving distance stored in the moving distance accumulating unit 35. When the accumulated moving distance is greater than the moving distance threshold value N31, the present operation proceeds to Step S204; otherwise, the present process is terminated without determining the location where the wireless device 30 exists, and returns to a start status in FIG. 4.

In Step S204, the location determining unit 36 compares the stored minimum estimated error value Y and a low speed error threshold N32. When the minimum estimated error value Y is smaller than the low speed error threshold N32, the present process proceeds to Step S205; otherwise, the present process is terminated without determining the location where the wireless device 30 exists, and returns to the start status in FIG. 4.

In Step S205, the location determining unit 36 determines the location where the wireless device 30 exists, based on the location information (positioning coordinate points) from which the stored minimum estimated error value Y was acquired.

As described above, the location determining unit 36 is configured to determine the location where the wireless device 30 exists, based on the location information (the positioning coordinate point) from which the stored minimum estimated error value Y was acquired, when the moving status determining unit 34 determines that the moving status of the wireless device 30 is the "low-speed moving status", when the accumulated moving distance is greater than the moving distance threshold value N31, and when the minimum estimated error value acquired within a predetermined period is smaller than the low speed error threshold N32.

Figure 6:
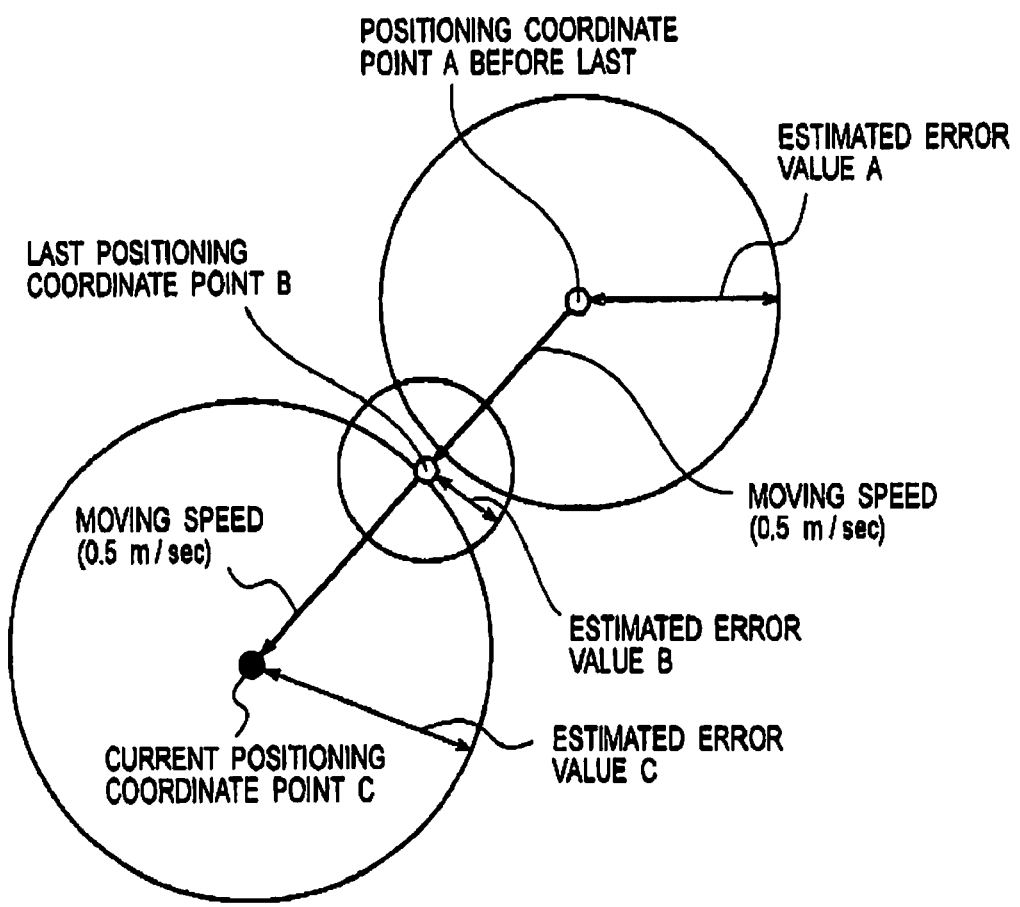
FIG. 6 is a diagram for showing an operation of the wireless device according to the first embodiment of the present invention when the wireless device positions location information while moving at the low speed.

As shown in FIG. 6, the wireless device 30 in the "low-speed moving status" is configured to determine the location where the wireless device 30 exists, by considering previously positioned positioning coordinate points A and B, as well as the current positioning coordinate point C.

Further, as shown in FIG. 6, when determining the location where the wireless device 30 exists, the wireless device 30 in the "low-speed moving status" can increase the number of positioning coordinate points to be referred so to.

Secondly, with reference to FIGS. 7 and 8, a description will be given of the process for determining the location when the moving status of the wireless device 30 is in the "middle-speed moving status".

Figure 7:
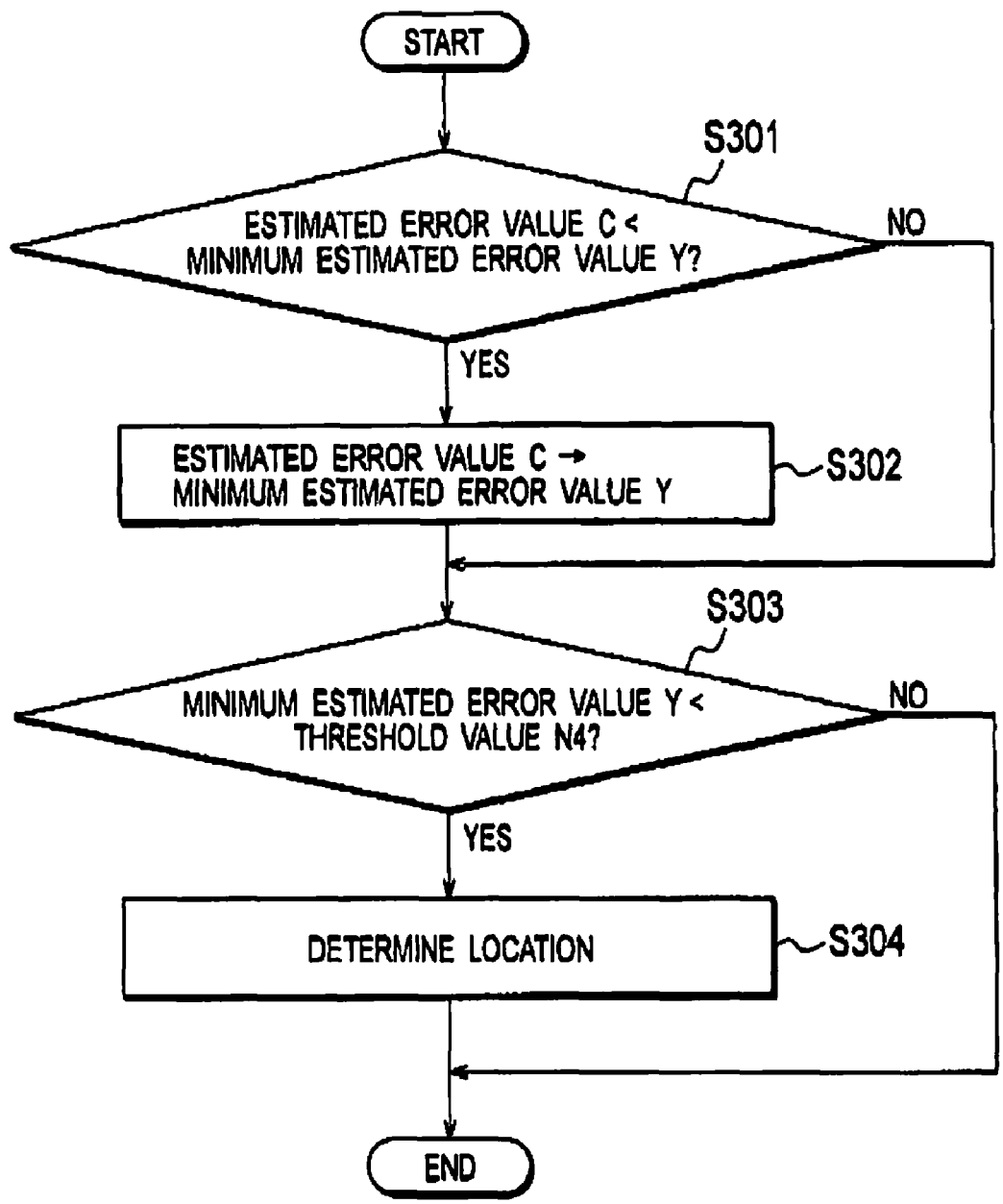
FIG. 7 is a flowchart showing an operation of the wireless device according to the first embodiment of the present invention when the wireless device positions location information while moving at a middle speed.

As shown in FIG. 7, in Step S301, the location determining unit 36 compares the minimum estimated error value Y of the moment and an estimated error value C of a coordinate point (location information of the wireless device 30) C acquired by the current positioning.

When the estimated error value C is smaller then the minimum estimated error value Y, in Step S302, the location determining unit 36 substitutes the estimated error value C into the minimum estimated error value Y. Otherwise, the present process proceeds to Step S303.

In Step S303, the location determining unit 36 compares a stored minimum value of the estimated error values Y, and a middle speed error threshold value N4. When the minimum estimated error value Y is smaller than the middle speed error threshold value N4, the present process proceeds to Step S304; otherwise, the present process is terminated without determining the location where the wireless device 30 exists, and returns to the start status of FIG. 4.

In Step S304, the location determining unit 36 determines the location where the wireless device 30 exists, based on the location information (positioning coordinate points) from which the stored minimum value of the estimated error values Y was acquired.

As described above, the location determining unit 36 is configured to determine the location where the wireless device 30 exists, based on the location information (the positioning coordinate point) from which the minimum estimated error value Y was acquired, when the moving status determining unit 34 determines that the moving status of the wireless device 30 is in the "middle-speed moving status", and when the minimum value of estimated error values (minimum estimated error value Y) acquired within a predetermined period is smaller than the middle speed error threshold N4.

Figure 8:
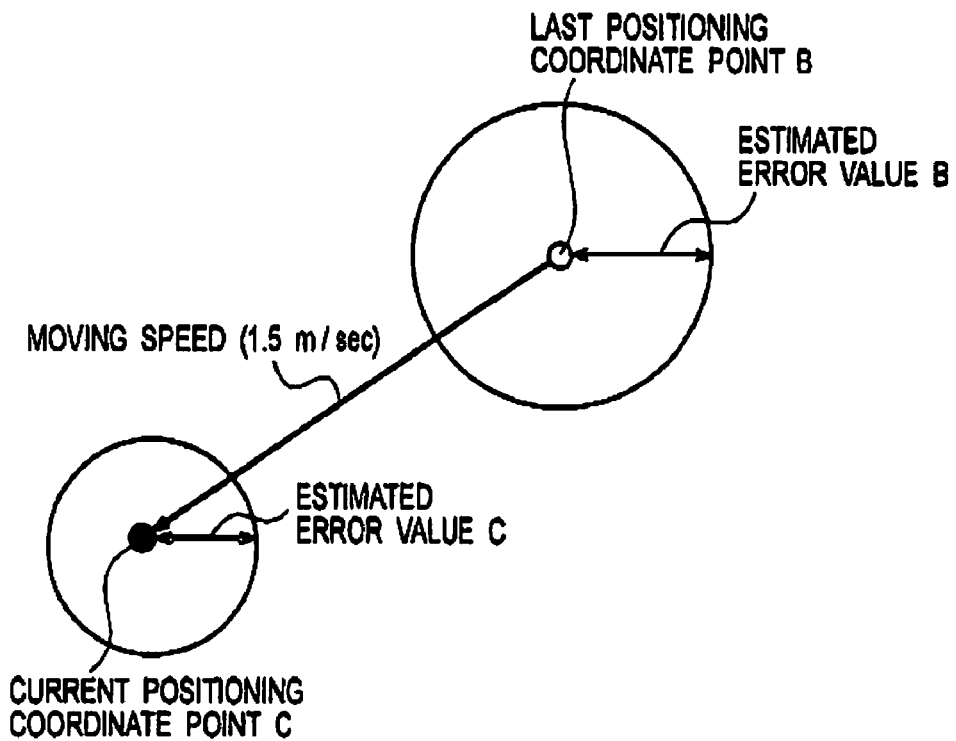
FIG. 8 is a diagram for showing an operation of the wireless device according to the first embodiment of the present invention when the wireless device positions location information while moving at the middle speed.

As shown in FIG. 8, the wireless device 30 in the "middle-speed moving status" is configured to determine the location where the wireless device 30 exists, by considering a previous positioning coordinate point B as well as the current positioning coordinate point C.

Thirdly, with reference to FIGS. 9 and 10, a description will be given of the process for determining the location when the moving status of the wireless device 30 is in the "high-speed moving status".

Figure 9:
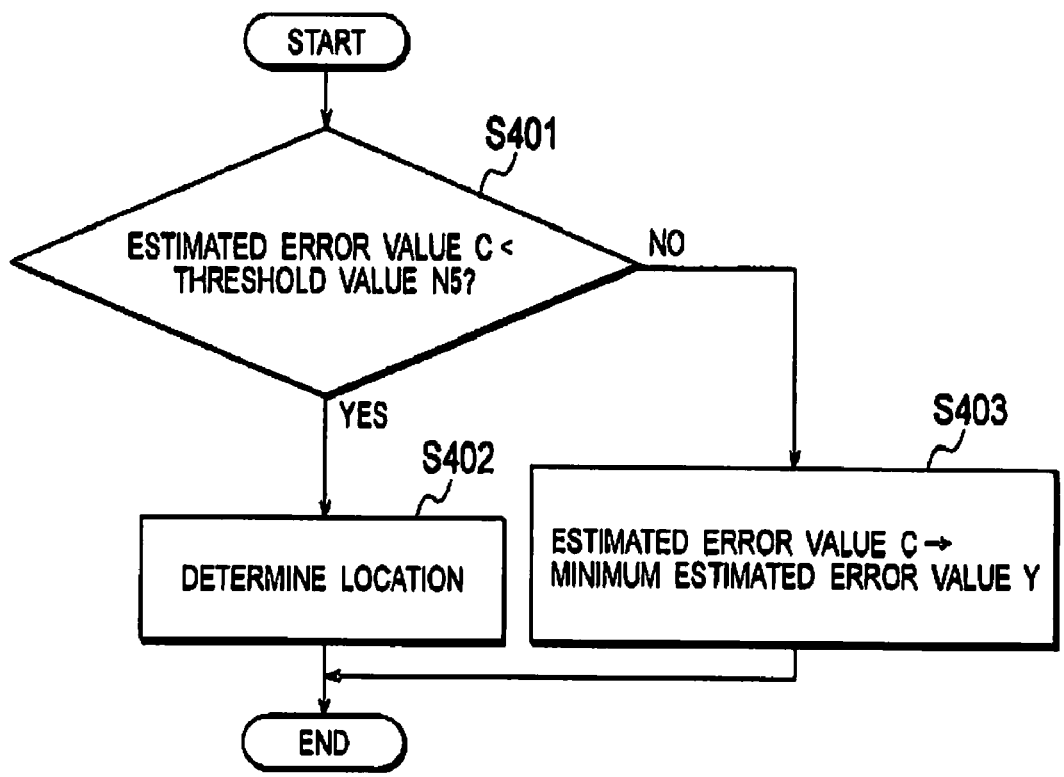
FIG. 9 is a flowchart showing an operation of the wireless device according to the first embodiment of the present invention when the wireless device positions location information while moving at a high speed.

As shown in FIG. 9, in Step S401, the location determining unit 36 compares an estimated error value C of a coordinate point (location information of the wireless device 30) C acquired by a current positioning, and a high speed error threshold value N5. When the minimum estimated error value Y is smaller than the high speed error threshold value N5, in Step S402, the location determining unit 36 determines the location where the wireless device 30 exists, based on the coordinate point C acquired by the current positioning.

Otherwise, in Step S403, the location determining unit 36 substitutes the estimated error value C into the minimum estimated error value Y, and the process is terminated without determining the location where the wireless device 30 exists, and returns to the start status in FIG. 4.

As described above, the location determining unit 36 is configured to determine the location where the wireless device 30 exists, based on the location information from which an estimated error value was acquired, when the moving status determining unit 34 determines that the moving status of the wireless device 30 is in the "high-speed moving status," and when the acquired estimated error value is smaller than the high speed error threshold N5.

Figure 10:
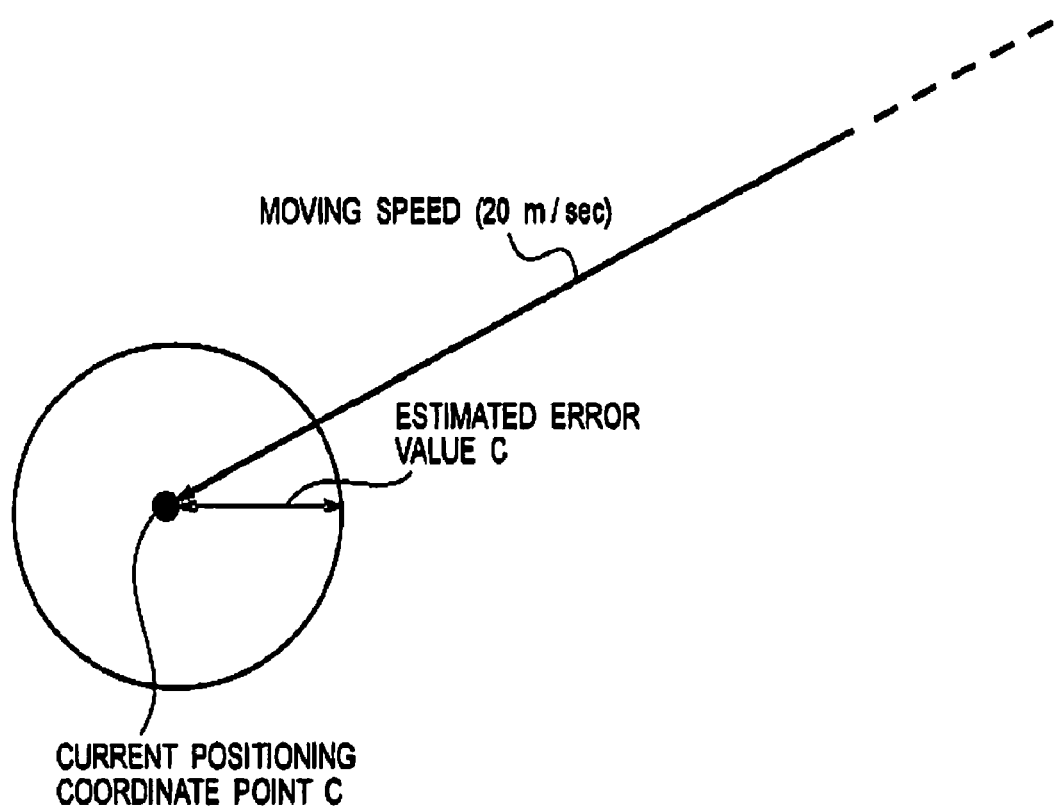
FIG. 10 is a diagram for showing an operation of the wireless device according to the first embodiment of the present invention when the wireless device positions location information while moving at a high speed.

As shown in FIG. 10, the wireless device 30 in the "high-speed moving status" is configured to determine the location where the wireless device 30 exists, by considering only the current positioning coordinate point C, without considering previous positioning coordinate points.

Fourthly, with reference to FIGS. 11 to 14, a description will be given of the process for determining the location according to the estimated error values.

Figure 11:
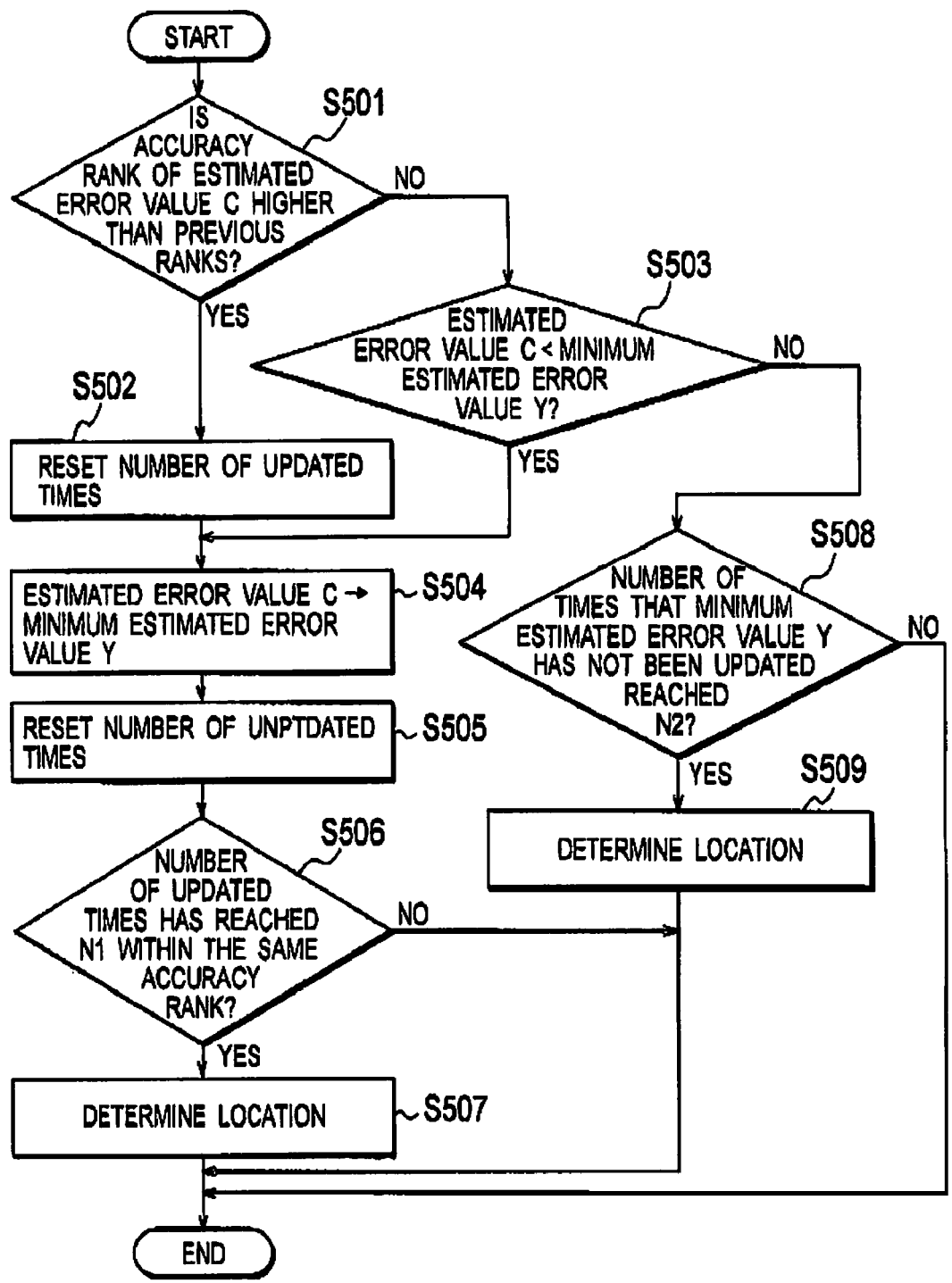
FIG. 11 is a flowchart showing an operation of the wireless device according to the first embodiment of the present invention when the wireless device positions location information while being stationary.

As shown in FIG. 11, in Step S501, the location determining unit 36 determines whether an estimated error value C of a coordinate point (location information of the wireless device 30) C acquired by a current positioning belongs to an error estimation rank higher (an estimated error value is smaller) than an accuracy rank (a error estimation rank) to which previous estimated error values belong. When it is determined as "YES," the present process proceeds to Step S502; and when it is determined as "NO," the present process proceeds to Step S503.

In this regard, the accuracy rank is used for categorizing acquired estimated error values according to their own magnitudes. For example, the accuracy rank is an "A" when the estimated error value is less than 10 m; the accuracy rank is a "B" when the estimated error value is not less than 10 m and less than 50 m; and the accuracy rank is a "C" when the estimated error value is not less than 50 m.

In Step S502, the location determining unit 36 resets a stored number of times that the minimum estimated error value Y is updated.

In Step S503, the location determining unit 38 compares the estimated error value C and the minimum estimated error value Y stored in the estimated error value acquiring unit 33. When the estimated error value C is smaller than the minimum estimated error value Y, the present process proceeds to Step S504, and otherwise, proceeds to Step S508.

In Step S504, the location determining unit 36 substitutes the estimated error value C into the minimum estimated error value Y so that the minimum estimated error value Y has been updated.

In Step S505, the location determining unit 36 resets the number of times that the minimum estimated error value Y has not been updated (number of unupdating of the minimum estimated error value Y).

In Step S506, the location determining unit 36 determines whether the number of times that the minimum estimated error value has been updated within the same accuracy rank (the error estimation rank) reaches a first threshold value N1.

When it is determined that the number of times that the minimum estimated error value Y has been updated reaches the first threshold value N1, the present process proceeds to Step S507; otherwise, the present process is terminated without determining the location where the wireless device 30 exists, and returns to the start status in FIG. 4.

In Step S507, the location determining unit 36 determines the location where the wireless device 30 exists, based on the location information (the positioning coordinate point) from which the stored minimum estimated error value Y was acquired.

In Step S508, the location determining unit 36 determines whether the number of times that the minimum estimated error value has not been updated reaches a second threshold value N2. When it is determined that the number of times that the minimum estimated error value has not been updated reaches the second threshold value N2, the present process proceeds to Step S509; otherwise, the present process is terminated without determining the location where the wireless device 30 exists, and returns to the start status in FIG. 4.

In Step S509, the location determining unit 36 determines the location where the wireless device 30 exists, based on the location information from which the stored minimum estimated error value Y was acquired.

Figure 12:
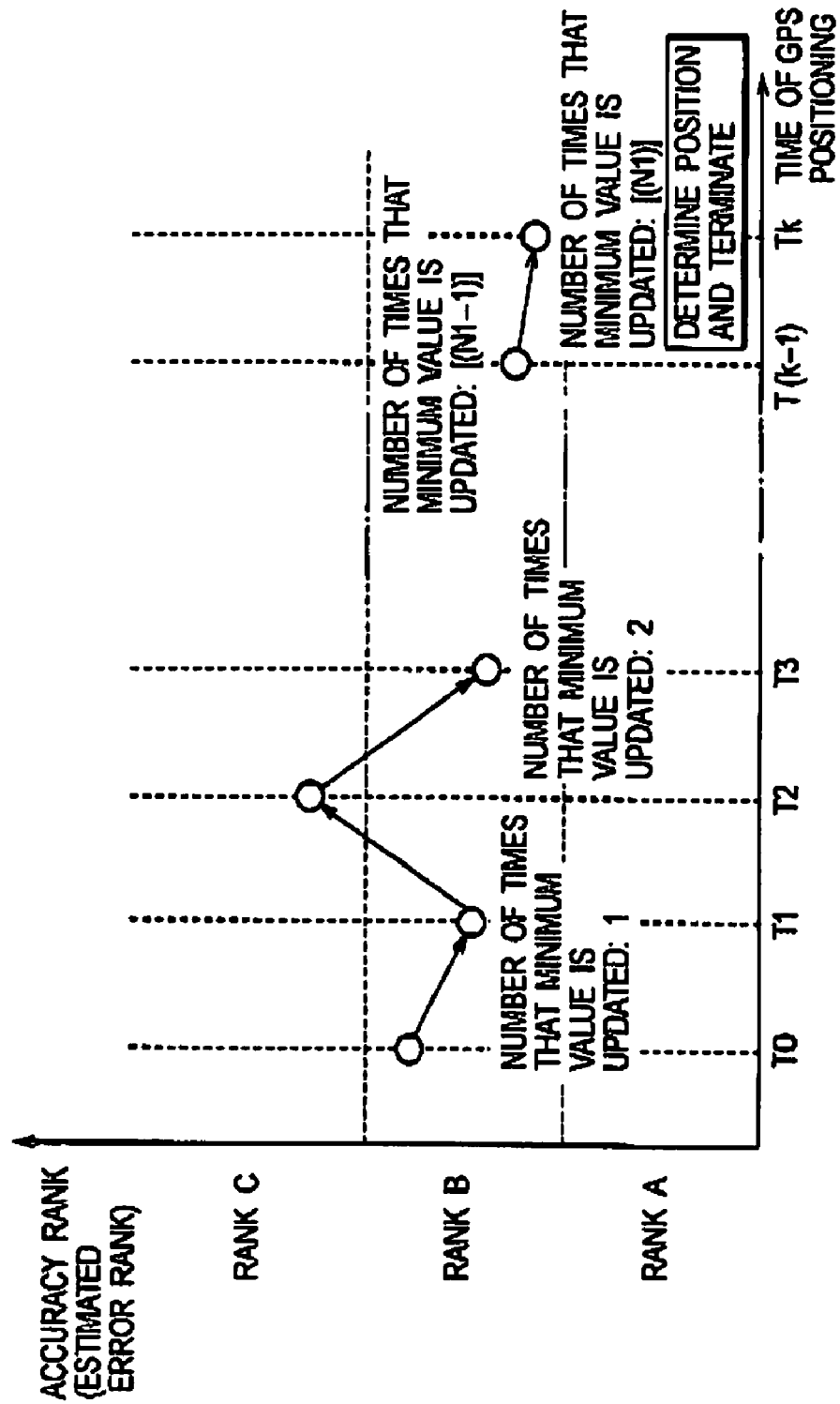
FIG. 12 is a diagram for showing an operation of the wireless device according to the first embodiment of the present invention when the wireless device positions location information while being stationary.

In an example of FIG. 12, the number of times that the minimum estimated error value Y has been updated within the rank B reaches "N1" at time Tk of a GPS positioning. Accordingly, the location determining unit 36 terminates the positioning and determines the location where the wireless device 30 exists.

As described above, the location determining unit 36 is configured to determine the location where the wireless device 30 exists, based on the location information from which a last updated minimum estimated error value was acquired, when the moving status determining unit 34 determines that the moving status of the wireless device 30 is the "stationary status" and when the so number of times that the minimum value of the estimated error values (the minimum estimated error value) within the same error estimation rank has been updated reaches the first threshold N1.

In other words, when the minimum estimated error value has been updated "N1" times within the same accuracy rank (rank B in the example of FIG. 12), the location determining unit 36 determines that a probability that a positioning accuracy is improved by further updating of the minimum estimated error value is low, terminates the positioning, and determines the location where the wireless device 30 exists based on the present positioning coordinate point.

Figure 13:
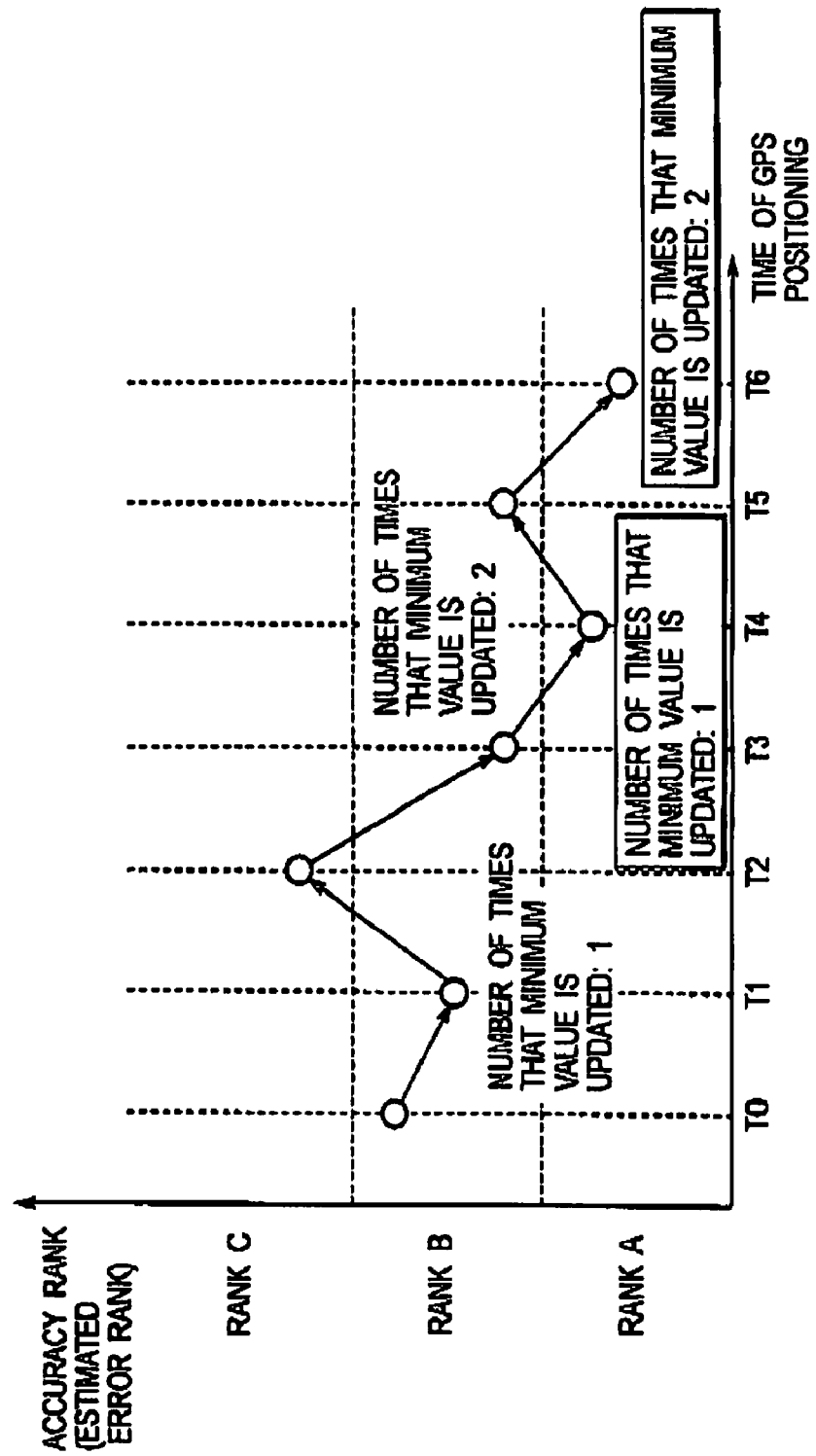
FIG. 13 is a diagram for showing an operation of the wireless device according to the first embodiment of the present invention when the wireless device positions location information while being stationary.

In an example of FIG. 13, an estimated error value at time T4 of the GPS positioning belongs to a higher error estimation rank (rank A) than error estimation ranks (rank B or rank C) to which previous estimated error values (estimated error values in a period of time T0 to T3 of the GPS positioning) belong. Accordingly, the current number of times that the minimum estimated error value Y has been updated is reset (becomes "0"). As a result, the number of times that the minimum estimated error value Y has been updated at time T4 of the GPS positioning is not "3", but "1."

As described above, the location determining unit 36 is configured to determine the location where the wireless device 30 exists, based on the location information from which the last updated minimum estimated error value was acquired, when the moving status determining unit 34 determines that the moving status of the wireless device 30 is the "stationary status" and when the number of times that the minimum value of the estimated error values (the minimum estimated error value) within the same error estimation rank has been updated reaches the first threshold N1. Further, when the error estimation rank to which the acquired estimated error value belongs is higher than an error estimation rank to which previously acquired estimated error value belongs, the number of times that the minimum value of the estimated error values (the minimum estimated error value) has been updated is reset.

In other words, when a newly acquired estimated error value belongs to a higher error estimation rank (an error estimation rank in which the estimated error value is small) than an error estimation rank to which a minimum value of the previously acquired estimated error values belong, the location determining unit 36 resets the current number of times that the minimum estimated error value has been updated, and thereafter, monitors the number of times that the minimum estimated error value has been updated within the high error estimation rank.

For example, when the location determining unit 36 has updated the minimum estimated error value four times within the "rank B" and thereafter acquires the estimated error value belonging to the "rank A" having higher accuracy, the location determining unit 36 resets the number of times that the minimum estimated error value has been updated to "0" and thereafter monitors the number of times that the minimum estimated error value has been updated within the "rank A" not within the "rank B".

Figure 14:
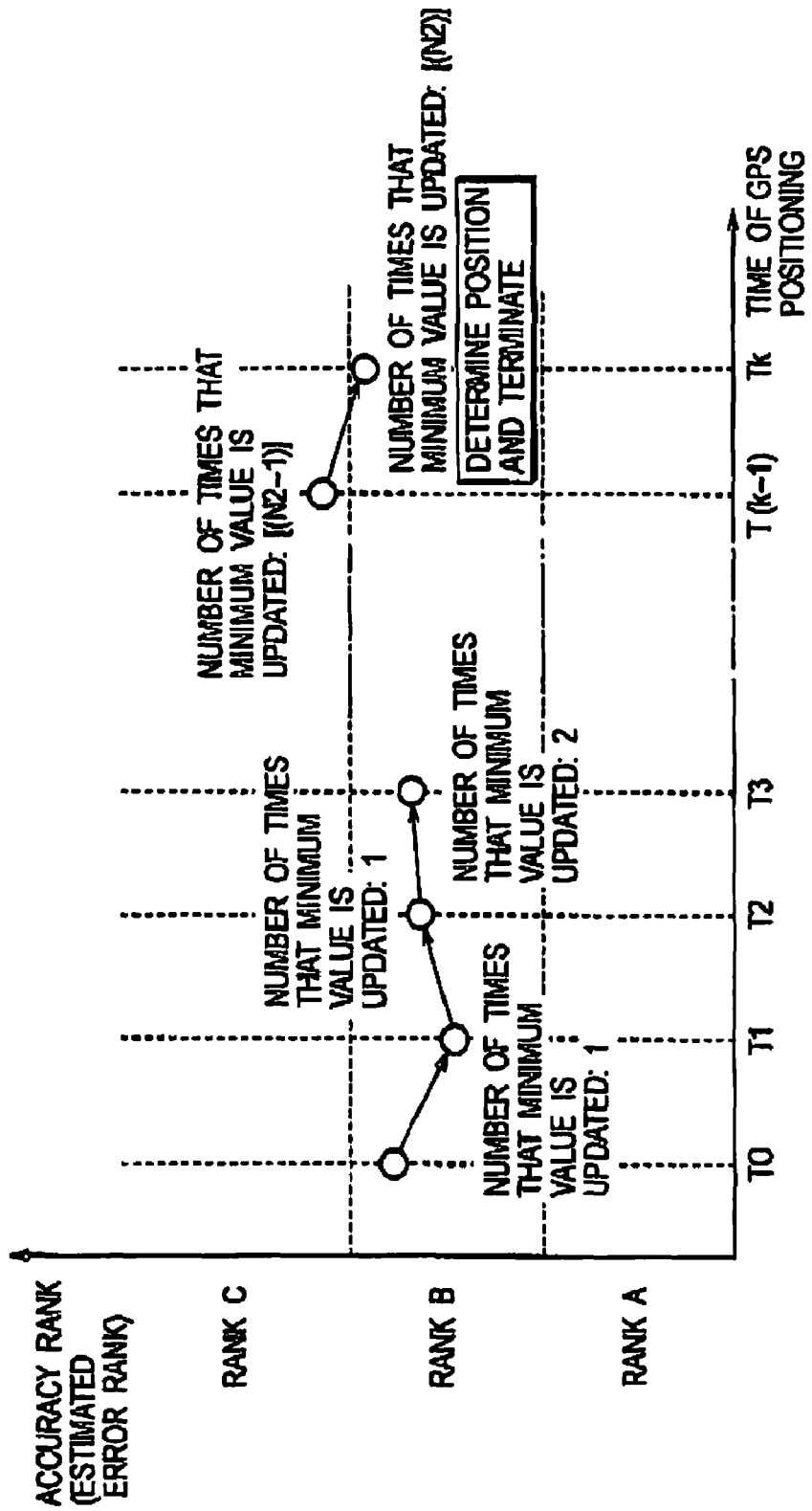
FIG. 14 is a diagram for showing an operation of the wireless device according to the first embodiment of the present invention when the wireless device positions location information while being stationary.

In an example of FIG. 14, at time Tk of the GPS positioning, the location determining unit 38 terminates the positioning and determines the location where the wireless device 30 exists, since the number of times that the minimum estimated error value Y has not been updated reaches "N2".

As described above, the location determining unit 36 is configured to determine the location where the wireless device 30 exists, based on the location information from which the minimum value of the estimated error values was acquired, when the moving status determining unit 34 determines that the moving status of the wireless device 30 is the "stationary status," and when the number of times that the minimum value of the estimated error values (the minimum estimated error value) has not been updated reaches the second threshold N2.

In other words, when the number of times that the minimum estimated error value has not been updated reaches "N2," the location determining unit 36 determines that a probability that the positioning accuracy is updated by further updating of the minimum estimated error value is low, terminates the positioning, and determines the location where the wireless device 30 exists, based on the present positioning coordinate point.

In addition to the above-described method of determining the location where the wireless device 30 exists, the location determining unit 36 is configured to determine the location where the wireless device 30 exists based on the coordinate points from which the stored minimum value of the estimated error values was acquired when the time of the positioning reaches a predetermined time Tmax.

Operation and Effect of Wireless Device According to the Present Embodiment

According to the wireless device of this embodiment, the location where the wireless device 30 exists is determined based on the moving status of the wireless device 30, and on the estimated error value of the location information (the positioning coordinate point) acquired by the GPS positioning function or the like. Accordingly, the location where the wireless device 30 exists can be acquired with a sufficient positioning accuracy by considering the influence from the surrounding environment of the positioning point, the influence from disposition of the GPS satellite, the moving status of the wireless device 30 and the like.

In addition, even when the values of the low speed, the middle speed, the high speed, and the values of the accuracy rank are set to other values than those described in the above-described embodiment, the same effect can be obtained.

Further, it is to be understood that the present invention is not intended to be limited to the above-described embodiment, and various changes may be made therein.

Industrial Applicability

As described above, the present invention can provide a wireless device which is capable of determining, with a sufficient positioning accuracy, a location so where the wireless device exists, even when a positioning coordinate point has an offset value to a true coordinate point due to the influence from the surrounding environment of the positioning point, the disposition of the GPS satellite and the like, or even when the wireless device is in the moving state.

The invention claimed is:

1. A wireless device capable of communicating via a wireless network, comprising:
   a location information acquiring unit configured to acquire location information of the wireless device;
   an estimated error value acquiring unit configured to acquire an estimated error value of the acquired location information;
   a moving status determining unit configured to determine a moving status of the wireless device; and
   a location determining unit configured to determine a location where the wireless device exists, based on the acquired estimated error value and the determined moving status when the moving status determining unit determines that the moving status of the wireless device is a middle-speed moving state and when a minimum value of estimated error values acquired within a predetermined period is smaller than a middle speed error threshold, the location determining unit determines the location where the wireless device exists, based on location information from which the minimum value of the estimated error values was acquired.

2. A wireless device capable of communicating via a wireless network, comprising:
- a location information acquiring unit configured to acquire location information of the wireless device;
- an estimated error value acquiring unit configured to acquire an estimated error value of the acquired location information;
- a moving status determining unit configured to determine a moving status of the wireless device;
- a location determining unit configured to determine a location where the wireless device exists, based on the acquired estimated error value and the determined moving status; and
- a moving distance accumulating unit configured to accumulate a moving distance of the wireless device,
- wherein when the moving status determining unit determines that the moving status of the wireless device is a low-speed moving state, when an accumulated moving distance is greater than a moving distance threshold value, and when a minimum value of estimated error values acquired within a predetermined period is smaller than a low speed error threshold, the location determining unit determines the location where the wireless device exists, based on location information from which the minimum value of the estimated error values was acquired.

3. A wireless device capable of communicating via a wireless network, comprising:
- a location information acquiring unit configured to acquire location information of the wireless device;
- an estimated error value acquiring unit configured to acquire an estimated error value of the acquired location information;
- a moving status determining unit configured to determine a moving status of the wireless device; and
- a location determining unit configured to determine a location where the wireless device exists, based on the acquired estimated error value and the determined moving status, wherein
- when the moving status determining unit determines that the moving status of the wireless device is a stationary state and when the number of times that the minimum value of the estimated error values, within a same error estimation rank, has been updated reaches a first threshold value, the location determining unit determines the location where the wireless device exists, based on location information from which a last updated minimum value of the estimated error values was acquired.

4. The wireless device according to claim 3, wherein the number of times that the minimum value of the estimated error values has been updated is configured to be reset when an error estimation rank to which an acquired estimated error value belongs is higher than an error estimation rank to which the previously acquired estimated error value belongs.

5. A wireless device capable of communicating via a wireless network, comprising:
- a location information acquiring unit configured to acquire location information of the wireless device;
- an estimated error value acquiring unit configured to acquire an estimated error value of the acquired location information;
- a moving status determining unit configured to determine a moving status of the wireless device; and
- a location determining unit configured to determine a location where the wireless device exists, based on the acquired estimated error value and the determined moving status, wherein
- when the moving status determining unit determines that the moving status of the wireless device is a stationary state, the location determining unit stops determining the location where the wireless device exists until the number of times that a minimum value of estimated error values has not been updated reaches a second threshold value,
- when the moving status determining unit determines that the moving status of the wireless device is the stationary state and when the number of times that a minimum value of estimated error values has not been updated reaches the second threshold value, the location determining unit determines the location where the wireless device exists, based on location information from which a last updated minimum value of the estimated error values was acquired.

* * * * *